(12) United States Patent
Wikström et al.

(10) Patent No.: US 11,115,148 B2
(45) Date of Patent: Sep. 7, 2021

(54) TECHNIQUE FOR SELECTING A TRANSPORT BLOCK SIZE IN A COMMUNICATION SYSTEM

(71) Applicant: Telefonaktiebolaget LM Ericsson (publ), Stockholm (SE)

(72) Inventors: Gustav Wikström, Täby (SE); Mattias Andersson, Sundbyberg (SE); Niklas Andgart, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/073,551

(22) PCT Filed: Feb. 3, 2017

(86) PCT No.: PCT/EP2017/052405
§ 371 (c)(1),
(2) Date: Jul. 27, 2018

(87) PCT Pub. No.: WO2017/134238
PCT Pub. Date: Aug. 10, 2017

(65) Prior Publication Data
US 2019/0044642 A1 Feb. 7, 2019

Related U.S. Application Data

(60) Provisional application No. 62/291,682, filed on Feb. 5, 2016.

(51) Int. Cl.
*H04L 5/00* (2006.01)
*H04L 1/00* (2006.01)
*H04L 27/26* (2006.01)

(52) U.S. Cl.
CPC .......... *H04L 1/0002* (2013.01); *H04L 1/0007* (2013.01); *H04L 1/0015* (2013.01);
(Continued)

(58) Field of Classification Search
CPC ... H04L 5/0048; H04L 5/0051; H04L 5/0053; H04L 5/0083; H04L 5/0096;
(Continued)

(56) References Cited

U.S. PATENT DOCUMENTS 9,668,167 B2    5/2017  Chen et al.
2014/0293811 A1* 10/2014 Rao ..................... H04W 52/262
                                                      370/252

(Continued)

FOREIGN PATENT DOCUMENTS

CN   101414870 A    4/2009
CN   103428777 A   12/2013
(Continued)

OTHER PUBLICATIONS

NTT Docomo Inc., "Variable TTI Length Control"; 3GPP TSG RAN WG2 Ad Hoc on LTE; Jun. 27, 2006, Cannes, France; pp. 1-3; R2-061921, 3GPP.

(Continued)

*Primary Examiner* — Harun Chowdhury
(74) *Attorney, Agent, or Firm* — Coats & Bennett, PLLC

(57) ABSTRACT

The disclosure pertains to selecting a Transport Block Size (TBS) in a communication system. An aspect is directed to an apparatus for selecting a Transport Block Size (TBS) for a transmitter of a communication system. The communication system supports variable Transmission Time Interval (TTI) lengths regarding the number of symbols to be transmitted in one TTI. The apparatus is configured to receive first information indicative of a TTI length, receive second information indicative of a number of reference symbols included in the TTI, decode, from the first information, the TTI length, and decode, from the second information, the number of reference symbols included in the TTI. The apparatus is further configured to calculate, based on the TTI
(Continued)

length and based on the number of reference symbols included in the TTI, a number of data symbols included in the TTI, calculate, based on an allocation bandwidth and based on the number of data symbols included in the TTI, a number of data Resource Elements (REs) in the TTI, and select the TBS from a data structure, based on the calculated number of data REs. Further aspects of the disclosure pertain to a base station, a UE, methods, computer programs, computer-readable recording media and a system.

10 Claims, 8 Drawing Sheets

(52) U.S. Cl.
CPC .......... *H04L 5/0007* (2013.01); *H04L 5/0092* (2013.01); *H04L 27/2602* (2013.01); *H04L 27/2617* (2013.01); *H04L 5/0048* (2013.01)

(58) Field of Classification Search
CPC ... H04L 1/0002; H04L 1/0007; H04L 5/0007; H04L 27/2617; H04W 16/14; H04W 52/262; H04W 72/04; H04W 72/14
USPC .......................................... 370/252, 328, 329
See application file for complete search history.

(56) References Cited

U.S. PATENT DOCUMENTS

| | | | |
|---|---|---|---|
| 2014/0301302 A1 | 10/2014 | Xu et al. | |
| 2018/0270794 A1* | 9/2018 | Tiirola | ............... H04L 5/0051 |
| 2018/0367279 A1* | 12/2018 | Hellge | ............... H04W 16/14 |
| 2019/0223204 A1* | 7/2019 | Kim | ............... H04W 72/14 |

FOREIGN PATENT DOCUMENTS

| | | |
|---|---|---|
| CN | 104285397 A | 1/2015 |
| CN | 104620656 A | 5/2015 |
| CN | 104754709 A | 7/2015 |
| EP | 2819473 A1 | 12/2014 |
| WO | 2014051492 A3 | 4/2014 |
| WO | 2014094294 A1 | 6/2014 |
| WO | 2014110796 A1 | 7/2014 |

OTHER PUBLICATIONS

3rd Generation Partnership Project, "Technical Specification Group Radio Access Network; Evolved Universal Terrestrial Radio Access (E-UTRA); Physical layer procedures (Release 8)"; TS 36.213 V8.8.0, Sep. 1, 2009, pp. 1-81; 3GPP, France.

Huawei, et al., "TBS determination for short TTI"; 3GPP TSG WG1 Meeting #87; Reno, USA; Nov. 14, 2016; pp. 1-4; R1-1611877, 3GPP.

Ericsson, "Evaluation methodology for latency reduction techniques"; 3GPP TSG RAN WG1 Meeting #83; Anaheim, USA; Nov. 15, 2015; pp. 1-6; R1-157145, 3GPP.

Ericsson, "WF on evaluation methodology for latency reduction"; 3GPP TSG RAN WG1 #83; Anaheim, USA; Nov. 15, 2015; pp. 1-9; R1-157732, 3GPP.

ZTE, "Performance evaluation on short TTI"; 3GPP TSG-RAN WG2 meeting #92; Anahaim, USA; Nov. 16, 2015; pp. 1-9, R2-156340, 3GPP.

* cited by examiner

| REs | TBS index 0 | TBS index 1 | TBS index 2 | TBS index 3 | TBS index 4 | TBS index 5 | TBS index 6 | TBS index 7 | TBS index 8 | ... |
|---|---|---|---|---|---|---|---|---|---|---|
| ... | ... | ... | ... | ... | ... | ... | ... | ... | ... | ... |
| 120 | 8 | 16 | 24 | 32 | 40 | 56 | 72 | 80 | 96 | ... |
| 132 | 16 | 24 | 24 | 32 | 48 | 64 | 80 | 96 | 112 | ... |
| 144 | 16 | 24 | 32 | 40 | 56 | 72 | 88 | 104 | 120 | ... |
| ... | ... | ... | ... | ... | ... | ... | ... | ... | ... | ... |

TECHNIQUE FOR SELECTING A TRANSPORT BLOCK SIZE IN A COMMUNICATION SYSTEM

TECHNICAL FIELD

The present disclosure generally relates to a technique for selecting a Transport Block Size (TBS) in a communication system. More specifically, and without limitation, methods and devices are provided for selecting a Transport Block Size for a transmitter of a communication system, wherein the communication system supports variable Transmission Time Interval (TTI) lengths.

BACKGROUND

In mobile communication under the current Long-Term Evolution (LTE) standard, a Transport Block Size (TBS) is selected from a specified TBS table, wherein the columns of the TBS table specify a number of Physical Resource Blocks (PRBs) and the rows of the TBS table specify a TBS index. Thus, the TBS Is selected based on a number of PRBs and based on a TBS Index. This setup is used for both uplink (UL) and downlink (DL) transmission with a Transmission Time Interval (TTI) length of 14 symbols, but covers all cases of number of Physical Downlink Control Channel (PDCCH) symbols and also the cases of extended cyclic prefix and Time-Division Duplex (TDD).

A certain bandwidth does in this case correspond to a narrow range of Resource Elements (REs). Both the User Equipment (UE) and the base station, i.e., the EnodeB (eNB), use the TBS table when choosing a transport format for transmission.

In short TTI (sTTI) transmission, the Physical Downlink Shared Channel (PDSCH) and Physical Uplink Shared Channel (PUSCH) of the DL and UL sub-frames are divided into multiple sTIs. In the DL, the sTTI contains fast scheduling information in the form of UL and DL short Downlink Control Information (short DCI, sDCI), specifying, e.g., the TTI length and whether reference symbols are included in the sTTI.

For short TTIs (sTTI), the number of REs in a sTTI can vary strongly. This means that a certain bandwidth defined by a number B of PRBs can correspond to a wide as range of REs and, thus, cannot reasonably be used as the basis for TBS selection. Also, with sTTI transmission, Demodulation Reference Symbols (DMRS) can be Inserted dynamically in the sTTI as needed, thereby reducing the amount of available data REs.

SUMMARY

Accordingly, there is a need for an improved technique for selecting a Transport Block Size (TBS) at least in certain scenarios.

According to a first aspect, an apparatus for selecting a Transport Block Size (TBS) for a transmitter of a communication system is provided. The communication system supports variable Transmission Time Interval (TTI) lengths regarding the number of symbols to be transmitted in one TI. The apparatus is configured to receive first information indicative of a TTI length, receive second Information indicative of a number of reference symbols included in the TTI, decode, from the first information, the TTI length, and decode, from the second information, the number of reference symbols included in the TTI. The apparatus is further configured to calculate, based on the TTI length and based on the number of reference symbols included in the TTI, a number of data symbols included in the TTI, calculate, based on an allocation bandwidth and based on the number of data symbols included in the TTI, a number of data Resource Elements (REs) in the TTI, and select the TBS from a data structure, based on the calculated number of data REs.

According to a second aspect, a User Equipment (UE) is provided, the UE comprising the apparatus of the first aspect.

According to a third aspect, an apparatus for selecting a Transport Block Size (TBS) for a transmitter of a communication system is provided. The communication system supports variable Transmission Time Interval (TTI) lengths regarding the number of symbols to be transmitted in one TTI. The apparatus is configured to prepare downlink transmission using an allocation bandwidth B represented by a number of Physical Resource Blocks (PRBs) and using a downlink TTI having a TTI length L represented by the number of symbols to be transmitted in one TTI, determine a number C of symbols in the TTI that have a Cell-specific Reference Signal (CRS), and determine a number R of symbols in the TTI that have a Demodulation Reference Symbol (DMRS). The apparatus is further configured to calculate, based on the allocation bandwidth B, based on the TTI length L, based on the number C of symbols in the TTI that have a Cell-specific Reference Signal (CRS) and based on the number R of symbols in the TTI that have a Demodulation Reference Symbol (DMRS) a number of data Resource Elements (REs) in the TTI, and select the TBS from a data structure, based on the calculated number of data REs.

According to a fourth aspect, a base station is provided, the base station comprising the apparatus of the third aspect.

According to a fifth aspect, a system is provided, the system comprising the user element of the second aspect and the base station of the fourth aspect.

According to a sixth aspect, an apparatus for selecting a Transport Block Size (TBS) for a transmitter of a communication system is provided. The communication system supports variable Transmission Time Interval (TTI) lengths regarding the number of symbols to be transmitted in one TTI. The apparatus Is configured to calculate a number of data symbols included in the TTI, determine an allocation bandwidth represented by a number of Physical Resource Blocks (PRBs), and select the TBS from a data structure, based on the calculated number of data symbols included in the TTI, based on the number of PRBs, and based on a TBS Index.

According to a seventh aspect, a method for selecting a Transport Block Size (TBS) for a transmitter of a communication system is provided. The communication system supports variable Transmission Time Interval (TTI) lengths regarding the number of symbols to be transmitted in one TTI. The method comprises receiving first information indicative of a TTI length, receiving second information Indicative of a number of reference symbols included in the TTI, decoding, from the first information, the TTI length, and decoding, from the second information, the number of reference symbols included in the TTI. The method further comprises calculating, based on the TTI length and based on the number of reference symbols included in the TTI, a number of data symbols included in the TTI, calculating, based on an allocation bandwidth and based on the number of data symbols included in the TTI, a number of data Resource Elements (REs) in the TTI, and selecting the TBS from a data structure, based on the calculated number of data REs.

According to an eighth aspect, a method for selecting a Transport Block Size (TBS) for a transmitter of a communication system is provided. The communication system supports variable Transmission Time Interval (TTI) lengths regarding the number of symbols to be transmitted in one TTI. The method comprises preparing downlink transmission using an allocation bandwidth B represented by a number of Physical Resource Blocks (PRBs) and using a downlink TTI having a TTI length L represented by the number of symbols to be transmitted in one TTI, determining a number C of symbols in the TTI that have a Cell-specific Reference Signal (CRS), and determining a number R of symbols in the TTI that have a Demodulation Reference Symbol (DMRS). The method further comprises calculating, based on the allocation bandwidth B, based on the TTI length L, based on the number C of symbols in the TTI that have a Cell-specific Reference Signal (CRS), and based on the number R of symbols in the TTI that have a Demodulation Reference Symbol (DMRS), a number of data Resource Elements (REs) in the TTI, and selecting the TBS from a data structure, based on the calculated number of data REs.

According to a ninth aspect, a method for selecting a Transport Block Size, TBS, for a transmitter of a communication system is provided. The communication system supports variable Transmission Time Interval, TTI, lengths regarding the number of symbols to be transmitted in one TTI. The method comprises calculating a number of data symbols included in the TTI, determining an allocation bandwidth represented by a number of Physical Resource Blocks (PRBs), and selecting the TBS from a data structure, based on the calculated number of data symbols included in the TI, based on the number of PRBs, and based on a TBS Index.

According to a tenth aspect, a computer program product is provided. The computer program product comprises program code portions to perform the steps of any of the seventh to ninth aspect when the computer program product is executed on one or more processing devices.

According to an eleventh aspect, one or more computer-readable recording media are provided, the computer program product of the tenth aspect being stored on the one or more computer-readable recording media.

In the following, details with regard to the first aspect are described. These details apply likewise to the other aspects described herein, where applicable.

The apparatus may correspond to or may be part of a User Equipment (UE) in an LTE mobile communication network. The telecommunication system may comprise at least a base station (e.g., an EnodeB, eNB) and a User Equipment (UE). The transmitter may be a transmitter of the UE. The apparatus may comprise a processor configured to carry out at least one of the steps defined with regard to the first aspect. A TTI length may be defined by a number L of symbols to be transmitted in one TTI. The first Information and the second information may be received in one combined message, e.g., in a Downlink Control Information (DCI) transmitted from the communication network to the UE. For example, the DCI may be transmitted from a base station of the communication network (e.g., an eNB) to the UE. The number of reference symbols included in the TTI may be read from a flag included in the second Information. For example, the flag may be included in the DCI.

Calculating a particular value A based on another value B may be understood such that the value A is the result of a calculation (e.g., an equation), which is influenced by the value B (e.g., such that value B Is a parameter used in the equation). Selecting the TBS from the data structure based on the calculated number of data REs may mean that the result of the selection is influenced by the number of data REs. For example, the TBS may be selected from a table, in which a row or a column indicates a particular value defining a number of data REs. In this case, a TBS may be selected from this particular row or column of the table.

The apparatus may be configured to calculate the number of data symbols included in the TTI by using the equation $D=L-R$, wherein D is the number of data symbols included in the TTI, L is the TTI length represented by the number of symbols to be transmitted in one TTI, and R is the number of reference symbols included in the TTI.

The above calculation may be performed for determining the number D of data symbols included in the uplink (UL) TTI. In this disclosure, uplink (UL) describes communication (i.e., data flow) from the UE to the base station (e.g., an eNB) and downlink (DL) describes communication from the base station to the UE.

The apparatus may be configured to calculate the number of data REs in the TTI by using the equation $N=B*D*S$, wherein N is the number of data REs in the TTI, B is the allocation bandwidth represented by a number of Physical Resource Blocks (PRBs), D is the number of data symbols included in the TTI, and S is the number of subcarriers in one PRB.

The number of subcarriers in one PRB may be $S=12$. Thus, the number of subcarriers in on PRB may be the number of subcarriers commonly used in LTE Orthogonal Frequency Division Multiplexing (OFDM) technology.

The first information and the second information may be included in a Downlink Control Information (DCI) received by the apparatus.

The DCI may be transmitted from the telecommunication network and, in particular, from the base station to the UE. The DCI may comprise further information besides the first and second Information. The second Information may correspond to a flag provided in the DCI.

The apparatus may be configured to select the TBS from the data structure, based on the calculated number of data REs and based on a TBS Index.

The selection of the TBS may be unambiguously defined by the number of data REs and by the TBS index. The TBS Index may be assigned to the apparatus. For example, the TBS index may be assigned to the UE, wherein the UE corresponds to the apparatus or comprises the apparatus. The TBS index may be assigned to the UE from the base station. Further, the base station may assign a first index to the UE, wherein the TBS index is selected based on the first index. The TBS index may be selected based on the first index by using a lookup table. This selection may be carried out by the UE or by the base station. The first index may be a Modulation and Coding Scheme (MCS) index.

The apparatus may be configured to receive information indicative of the TBS index. The information Indicative of the TBS index may comprise the TBS index or may comprise information from which the TBS Index may be derived. For example, the information Indicative of the TBS index may comprise a first Index, based on which the TBS Index may be determined. The Information Indicative of the TBS index may be received from the telecommunication network. For example, the Information indicative of the TBS Index may be received from the base station (e.g., an eNB).

The data structure may be a lookup table. For example, the data structure may be a 2-dimensional lookup table. In the lookup table, the rows may represent different numbers of data REs, the columns may represent different TBS indexes and the individual fields of the table may indicate TBS values for the individual combinations of number of data REs-TBS Index.

The number of reference symbols included in the TTI may be a number of Demodulation Reference Symbols (DMRS) included in the TTI. The number of reference symbols included in the TTI may be either R=0 or R=1.

The second Information may comprise a flag indicating whether the number of DMRSs included in the TI is either 0 or 1. In the step of decoding the second Information, the apparatus may read the flag. However, the possible number of reference symbols included in the TTI is not limited to R=0 or R=1. Any other number of reference symbols and, in particular, DMRS included in the TTI may be implemented and indicated in the second information. For example, a number of DMRSs included in the TTI may be R=0, 1, or 2. Further, for example, a number of DMRSs included in the TTI may be between R=0 and R=10. The second Information may indicate the number of DMRSs included in the TTI, also in the case this number is larger than 1.

The TTI may be a short TTI (sTTI).

In the following, details of the second aspect are described, wherein the above details of the first aspect are also applicable with regard to the second aspect, where possible.

The apparatus may correspond to or may be part of a base station in an LTE mobile communication network. In particular, the apparatus may correspond to or may be part of an EnodeB (eNB). The telecommunication system may comprise at least a base station (e.g., an EnodeB, eNB) and a User Equipment (UE). The transmitter may be a transmitter of the eNB. The apparatus may comprise a processor configured to carry out at least one of the steps defined with regard to the second aspect. Further, a virtualized server may be provided for carrying out the steps defined with regard to the second aspect. Thus, the apparatus may comprise a plurality of sub-apparatuses spatially separated from each other. The apparatus may comprise one or more processors for carrying out the steps defined with regard to the second aspect, wherein the apparatus may be configured to decide, which of the steps are performed by which processor at which time.

The number L may indicate the TTI length expressed by a number of Orthogonal Frequency Division Multiplexing (OFDM) symbols. The number C may indicate the number of OFDM symbols in the TTI that have CRS. The number R may indicate the number of OFDM symbols in the TTI with DMRS.

The apparatus may be configured to determine the number C of symbols in the TTI that have a CRS based on a start index of the TTI and based on the TTI length L.

The apparatus may be configured to determine a number $N_{DMRS}$ of Demodulation Reference Symbol Resource Elements (DMRS REs) per Physical Resource Block (PRB) used in downlink (DL), in symbols with DMRS, determine a number $N_{CRS}$ of Cell-specific Reference Signal Resource Elements (CRS REs) per Physical Resource Block (PRB) used in downlink (DL), in symbols with CRS, wherein the calculation of the number of data REs in the TTI is further based on the number $N_{DMRS}$ of DMRS REs per PRB used in DL in symbols with DMRS and based on the number $N_{CRS}$ of CRS REs per PRB used in DL in symbols with CRS.

In view of the above definition of $N_{DMRS}$ and $N_{CRS}$, the unit of these values may be RE/symbol/PRB, i.e., number of RE per symbol in time and per PRB In frequency.

The apparatus may be configured to calculate the number of data REs in the TTI by using the equation $N=B*(L*S-C*N_{CRS}-R*N_{DMRS})$, wherein N is the number of data REs in the TTI, B is the allocation bandwidth represented by a number of Physical Resource Blocks (PRBs) L is the TTI length represented by the number of symbols to be transmitted in one TTI, S is the number of subcarriers in one PRB, C is the number of symbols in the TTI that have a CRS, $N_{CRS}$ is the number of CRS REs per PRB used in DL in symbols with CRS, R is the number of symbols in the TTI that have a DMRS, and $N_{DMRS}$ is a number of DMRS REs per PRB used in DL in symbols with DMRS.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for Long Term Evolution (LTE) and 5G implementations, it is readily apparent that the technique described herein may also be implemented in any other wireless communication network, including a Wireless Local Area Network (WLAN) according to the standard family IEEE 802.11 (e.g., IEEE 802.11a, g, n or ac; also referred to as Wi-Fi) and/or a Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
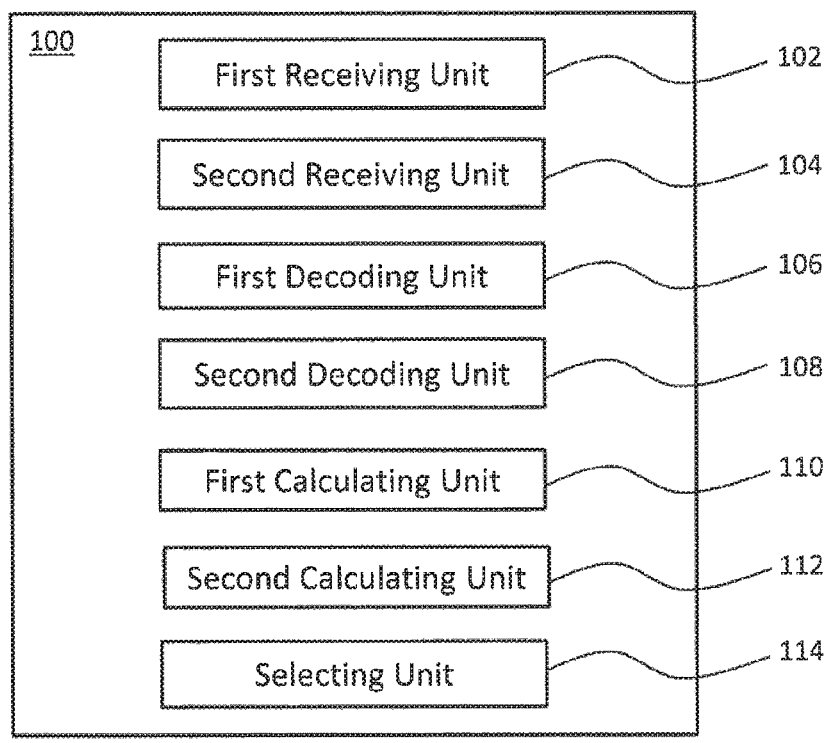
FIG. 1 shows a schematic block diagram of an apparatus for selecting a Transport Block Size (TBS) for a transmitter of a communication system, wherein the apparatus may be implemented as part of a User Equipment (UE) of a mobile communication network.

FIG. 1 schematically illustrates an apparatus 100 for selecting a Transport Block Size (TBS) for a transmitter of a communication system. The apparatus 100 comprises a first receiving unit 102 for receiving first information indicative of a TTI length. The apparatus 100 comprises a second receiving unit 104 for receiving second Information Indicative of a number of reference symbols included in the TTI. The apparatus 100 comprises a first decoding unit 106 for decoding, from the first information, the TTI length. The apparatus 100 comprises a second decoding unit 108 for decoding, from the second information, the number of reference symbols included in the TTI. The apparatus 100 comprises a first calculating unit 110 for calculating, based on the TTI length and based on the number of reference symbols included in the TTI, a number of data symbols included in the TTI. The apparatus 100 comprises a second calculating unit 112 for calculating, based on an allocation bandwidth and based on the number of data symbols included in the TTI, a number of data REs in the TTI. The apparatus 100 further comprises a selecting unit 114 for selecting the TBS from a data structure, based on the calculated number of data REs.

The first receiving unit 102 and the second receiving unit 104 may be provided as a combined receiving unit (not shown). Similarly, the first decoding unit 106 and the second decoding unit 108 may be provided as a combined decoding unit (not shown). Further, the first calculating unit 110 and the second calculating unit 112 may be provided as a combined calculating unit (not shown).

The apparatus 100 may be implemented at a User Equipment (UE) of the mobile communication network, e.g., a cellular network. The first receiving unit 102 and the second receiving unit 104 are configured to receive the first and second information, respectively, from the mobile communication network and, more precisely, from a base station (e.g., an eNB) of the mobile communication network.

Figure 2:
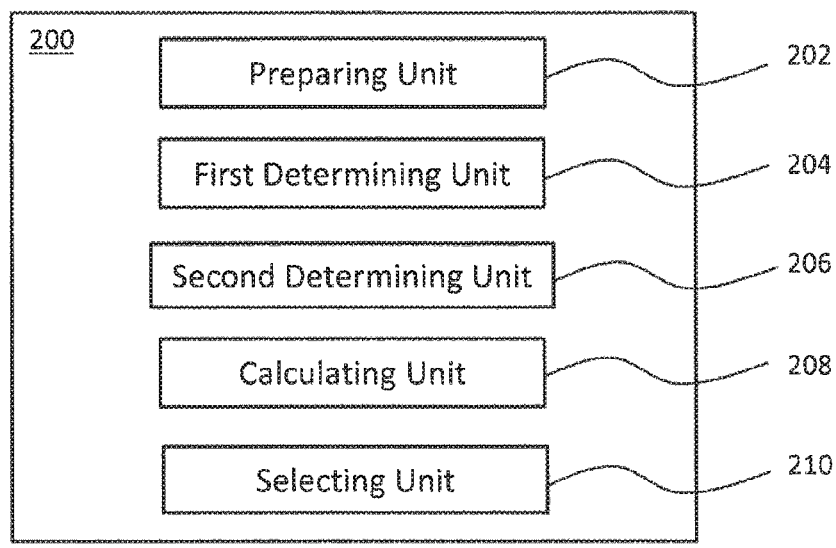
FIG. 2 shows a schematic block diagram of an apparatus for selecting a Transport Block Size (TBS) for a transmitter of a communication system, wherein the apparatus may be implemented as part of a base station of a mobile communication network.

FIG. 2 schematically illustrates an apparatus 200 for selecting a Transport Block Size (TBS) for a transmitter of a communication system. The apparatus 200 comprises a preparing unit 202 for preparing downlink transmission using an allocation bandwidth B represented by a number of PRBs and using a downlink TTI having a TTI length L represented by the number of symbols to be transmitted in one TTI. The apparatus 200 comprises a first determining unit 204 for determining a number C of symbols in the TTI that have a CRS. The apparatus 200 comprises a second determining unit 206 for determining a number R of symbols in the TTI that have a DMRS. The apparatus 200 comprises a calculating unit 208 for calculating, based on the allocation bandwidth B, based on the TTI length L, based on the number C of symbols in the TTI that have a CRS, and based on the number R of symbols in the TTI that have a DMRS, a number of data REs in the TTI. The apparatus 200 further comprises a selecting unit 210 for selecting the TBS from a data structure, based on the calculated number of data REs.

The first determining unit 204 and the second determining unit 206 may be provided as a combined determining unit (not shown).

The apparatus 200 may be implemented at a node of the mobile communication network, e.g., a cellular network. More precisely, the apparatus 200 may be implemented as part of a base station (e.g., an EnodeB, eNB) of the mobile communication network.

Figure 3:
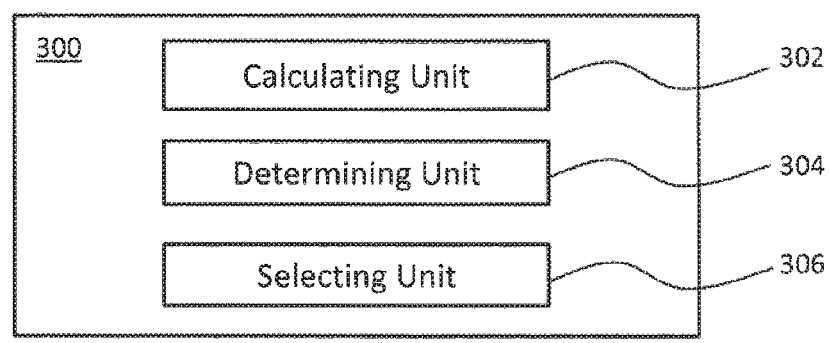
FIG. 3 shows a schematic block diagram of an apparatus for selecting a Transport Block Size (TBS) for a transmitter of a communication system, wherein the apparatus may be implemented as part of a User Equipment or as part of a base station of a mobile communication network.

FIG. 3 schematically illustrates an apparatus 300 for selecting a Transport Block Size (TBS) for a transmitter of a communication system. The apparatus 300 comprises a calculating unit 302 for calculating a number of data symbols included in the TTI.

The apparatus 300 comprises a determining unit 304 for determining an allocation bandwidth represented by a number of PRBs. The apparatus 300 further comprises a selecting unit 306 for selecting the TBS from a data structure, based on the calculated number of data symbols included in the TI, based on the number of PRBs, and based on a TBS Index.

The apparatus 300 may be Implemented at a UE or at a node of the mobile communication network. More precisely, the apparatus 300 may be implemented as part of a UE of the mobile communication network and/or as part of a base station (e.g., an EnodeB, eNB) of the mobile communication network.

A communication system may comprise, e.g., a UE comprising the apparatus 100 or 300 and an eNB comprising the apparatus 200 or 300.

Figure 4:
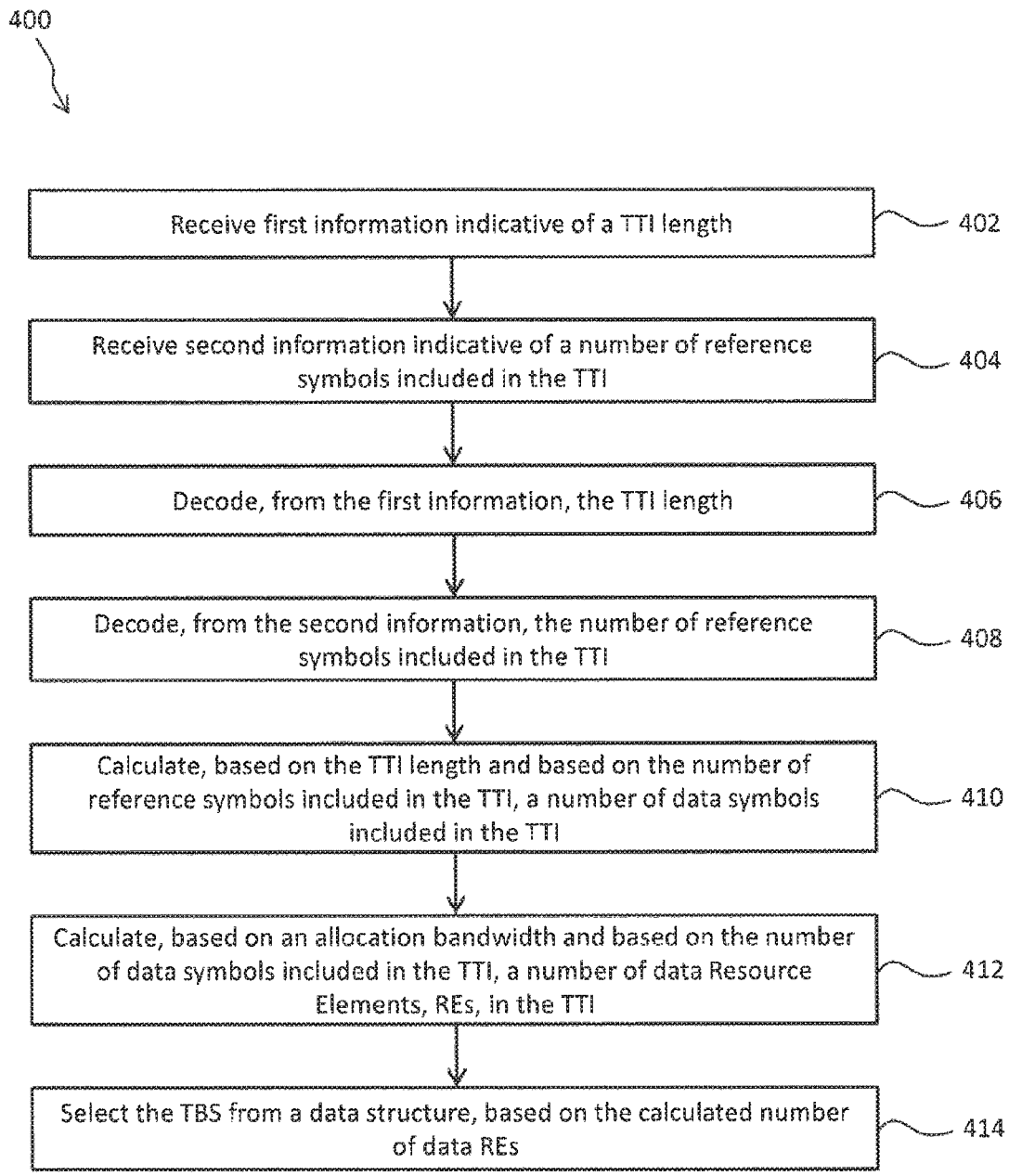
FIG. 4 shows a flowchart for a method of selecting a Transport Block Size (TBS) for a transmitter of a communication system, wherein the method is implementable by the device of FIG. 1.

FIG. 4 shows a flowchart for a method 400 of selecting a TBS for a transmitter of a communication system, wherein the communication system supports variable TI lengths regarding the number of symbols to be transmitted in one TTI. In a step 402, first information indicative of a TTI length Is received. In a step 404, second Information indicative of a number of reference symbols included in the TTI is received. In a step 406, the TTI length Is decoded from the first Information. In a step 408, the number of reference symbols included in the TTI is decoded from the second Information. In a step 410, a number of data symbols included in the TTI is calculated, based on the TTI length and based on the number of reference symbols included in the TTI. In a step 412, a number of data REs in the TTI is calculated, based on an allocation bandwidth and based on the number of data symbols included in the TTI. In a step 414, the TBS is selected from a data structure, based on the calculated number of data REs.

The method 400 of FIG. 4 may be carried out in the indicated order but the order is not limited to this order. For example, steps 402 and 404 may be exchanged with each other and/or steps 406 and 408 may be exchanged with each other. The method 400 may be Implemented by the device 100 shown in FIG. 1.

Figure 5:
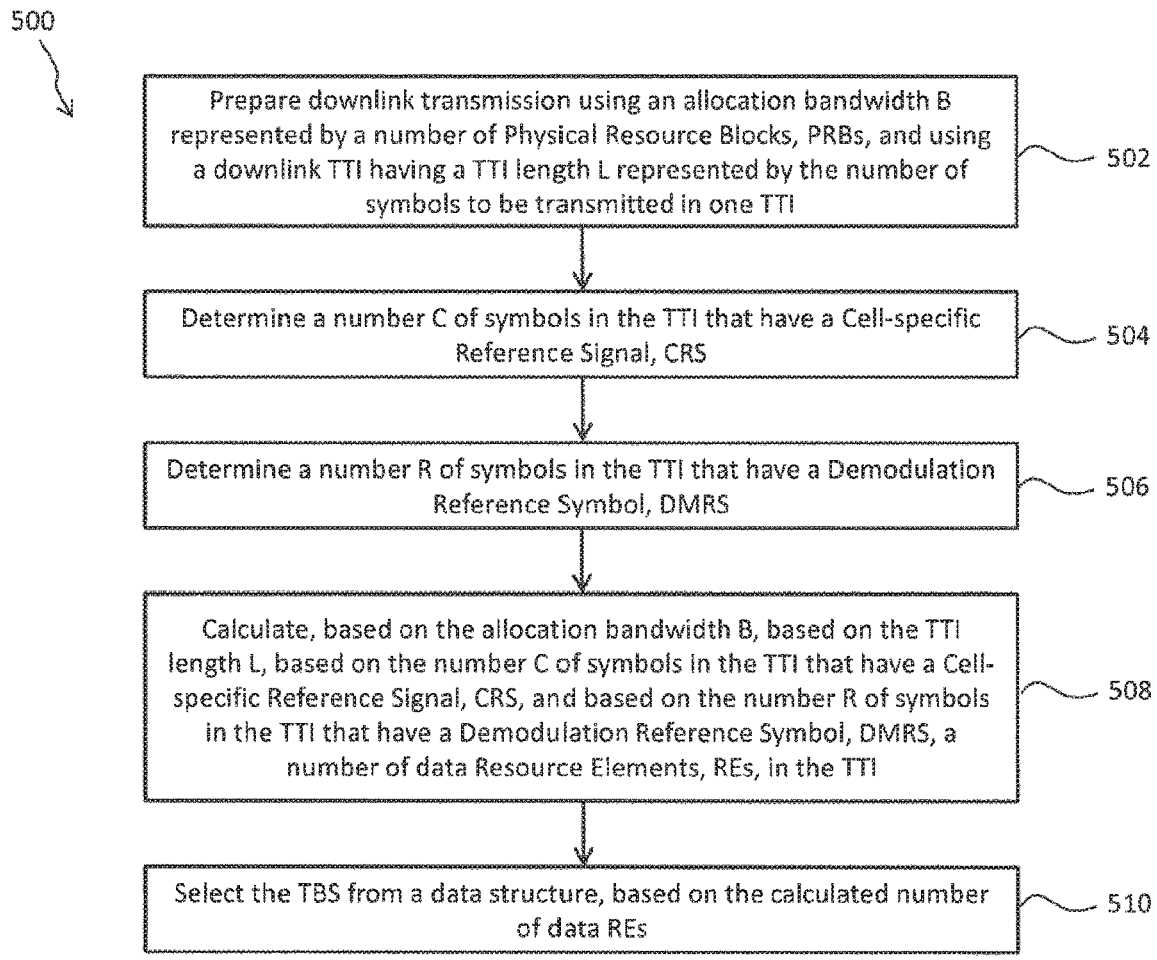
FIG. 5 shows a flowchart for a method of selecting a Transport Block Size (TBS) for a transmitter of a communication system, wherein the method is implementable by the device of FIG. 2.

FIG. 5 shows a flowchart for a method 500 of selecting a TBS for a transmitter of a communication system, wherein the communication system supports variable TTI lengths regarding the number of symbols to be transmitted in one TTI. In a step 502, downlink transmission is prepared using an allocation bandwidth B represented by a number of PRBs and using a downlink TTI having a TTI length L represented by the number of symbols to be transmitted in one TTI. In a step 504, a number C of symbols in the TTI that have a CRS is determined. In a step 506, a number R of symbols in the TTI that have a DMRS is determined. In a step 508, a number of data REs in the TTI is calculated, based on the allocation bandwidth B, based on the TTI length L, based on the number C of symbols in the TTI that have a CRS, and based on the number R of symbols in the TTI that have a DMRS. In a step 510, the TBS is selected from a data structure, based on the calculated number of data REs.

The method 500 of FIG. 5 may be carried out in the indicated order but is the order not limited to this order. For example, steps 504 and 506 may be exchanged with each other. The method 500 may be implemented by the device 200 shown in FIG. 2.

Figure 6:
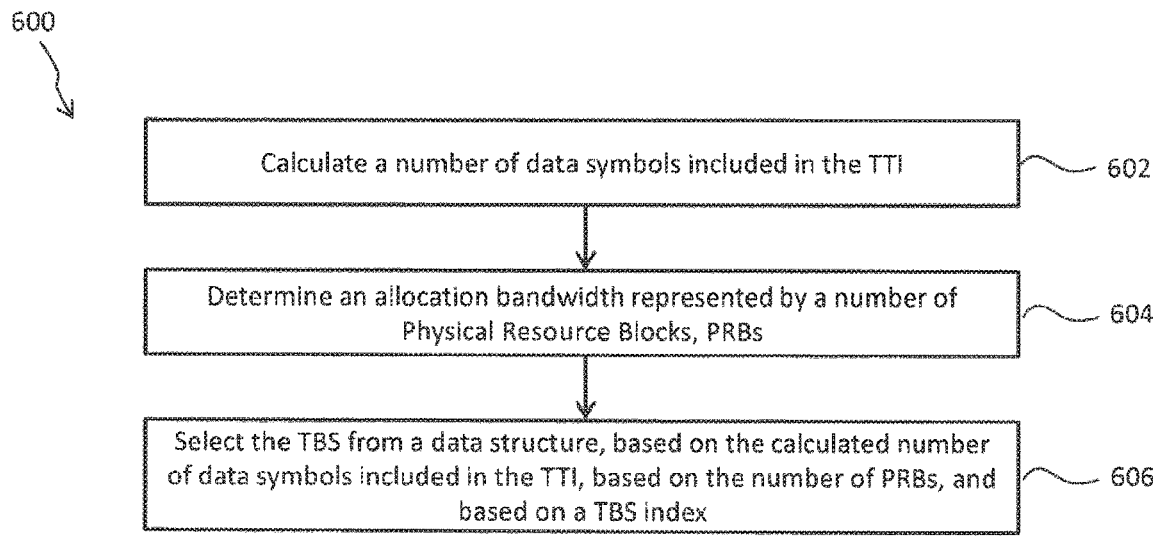
FIG. 6 shows a flowchart for a method of selecting a Transport Block Size (TBS) for a transmitter of a communication system, wherein the method is implementable by the device of FIG. 3.

FIG. 6 shows a flowchart for a method 600 of selecting a TBS for a transmitter of a communication system, wherein the communication system supports variable TI lengths regarding the number of symbols to be transmitted in one TTI. In a step 602, a number of data symbols included in the TI is calculated. In a step 604, an allocation bandwidth represented by a number of PRBs is determined. In a step 606, the TBS is selected from a data structure, based on the calculated number of data symbols included in the TTI, based on the number of PRBs, and based on a TBS index.

The method 600 of FIG. 6 may be carried out in the indicated order but Is not limited to this order. For example, steps 602 and 604 may be exchanged with each other. The method 600 may be implemented by the device 300 shown in FIG. 3.

Figure 7:
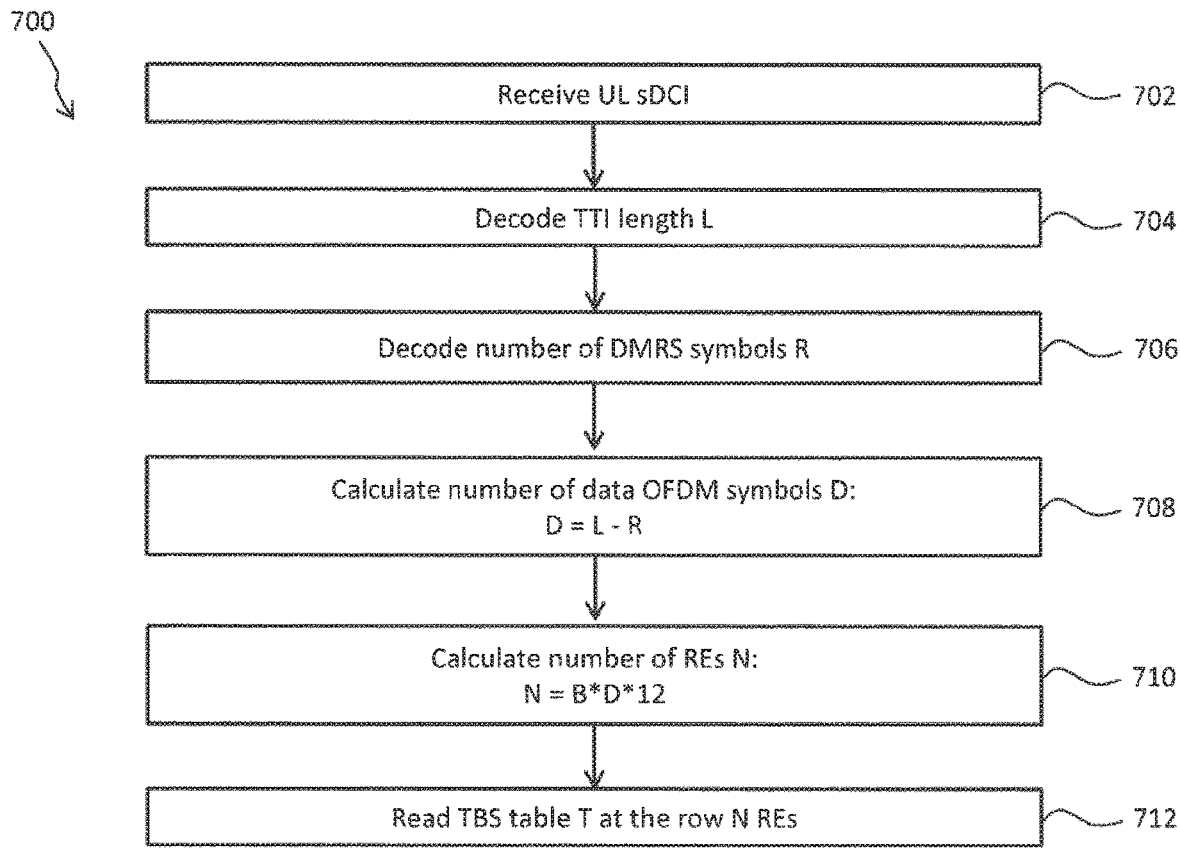
FIG. 7 shows a flowchart for a method of selecting a Transport Block Size (TBS) for a transmitter of a communication system, wherein the method is implementable by a User Equipment (UE), for example by the device of FIG. 1.

FIG. 7 shows a flowchart for a method 700 carried out by an apparatus for selecting a TBS for a transmitter of a communication system. For example, the method 700 is carried out by a User Equipment (UE) of the communication system. In particular, the method 700 is carried out by a UE of a cellular network, which is an example of a so mobile communication network. The method 700 may be regarded as a specific implementation of the method 400 described above.

In a step 702, the UE receives an Uplink (UL) short Downlink Control Information (short DCI, sDCI), e.g., from an EnodeB (eNB) of the cellular network. From the UL sDCI the UE reads (i.e., decodes) the Transmission Time Interval (TTI) length L of Orthogonal Frequency Division Multiplexing (OFDM) symbols in a step 704. In a step 706, the UE reads (i.e., decodes) a flag of the sDCI indicating the number R (0 or 1) of Demodulation Reference Symbols (DMRS OFDM symbols) included in the UL or Downlink (DL) short TTI (sTTI).

However, the possible number of reference symbols included in the TTI is not limited to R=0 or R=1. Any other number of reference symbols and, in particular, DMRS included in the TTI may be implemented and Indicated in the sDCI. For example, a number of DMRSs included in the TTI may be R=0, 1, or 2. Further, for example, a number of DMRSs included in the TTI may be between R=0 and R=10. The sDCI may Indicate the number of DMRSs included in the TTI, also in the case this number is larger than 1.

The UE can then calculate, in step 708, the number D of data OFDM symbols. For UL this is set to:

$$D = L - R.$$

Given an allocated bandwidth of B Physical Resource Blocks (PRBs), the UE then calculates, in a step 710, the number N of Resource Elements (REs) based on the following equation:

$$N = B*D*12. \qquad [\text{Eq. 1}]$$

Here, N is the number of data REs in the TTI, B is the allocation bandwidth represented by a number of PRBs, D is the number of data symbols included in the TTI, and the number of subcarriers in one PRB is 12. In case a different number S of subcarriers in one PRB is used, the value 12 in Eq. 1 is replaced by the number S.

Figure 9:
FIG. 9 shows an example of a TBS table that may be accessed by the apparatus of FIG. 1 and/or by the apparatus of FIG. 2.

With the calculated value for N from Eq. 1 above, the UE accesses, in a step 712, a TBS table where the rows (in this example) are for a certain number of REs and the columns are for a certain TBS index, see the exemplary TBS table 900 shown in FIG. 9. Thus, based on the calculated number N of data REs in the TTI and based on a TBS Index, a TBS is selected from the TBS table. Of course, alternatively, a TBS table may be provided, in which the columns indicate a certain number of REs and the rows indicate a certain TBS Index.

The TBS index may be assigned to the UE by the cellular network. In particular, the TBS index may be assigned by an eNB to the UE. For example, the TBS Index may either be directly assigned to the UE in a message comprising the TBS Index or the UE may transmit a first Index, based on which the UE may derive the TBS index. For example, the UE may derive the TBS index from the first index by accessing a lookup table, in which a first row indicates a particular first index and a second row indicates a particular TBS Index. The first index may be a Modulation and Coding Scheme (MCS) Index.

As described above, with short TTI transmission, the UE reads the TTI length in a UL sDCI, and also a flag to indicate whether a DMRS is included in the sTTI. From this information the UE calculates the number of data REs in the sTTI and retrieves the TBS for a TBS index from a sTTI TBS table based on this value.

Figure 8:
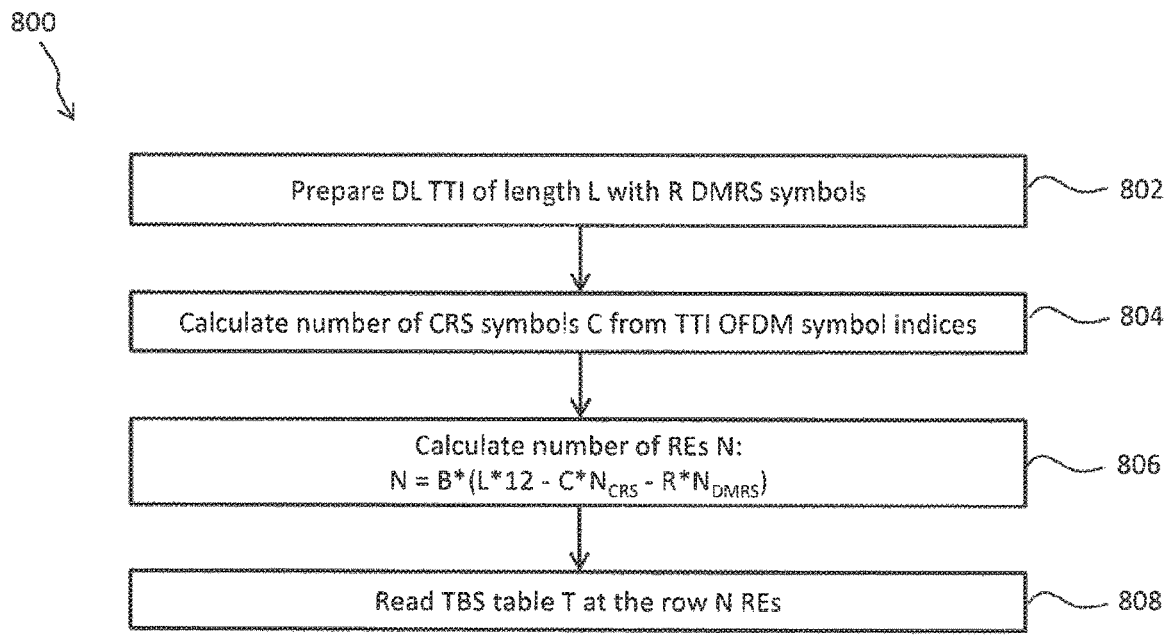
FIG. 8 shows a flowchart for a method of selecting a Transport Block Size (TBS) for a transmitter of a communication system, wherein the method is implementable by a base station, for example by the device of FIG. 2.

FIG. 8 shows a flowchart for a method 800 carried out by an apparatus for selecting a TBS for a transmitter of a communication system. For example, the method 800 is carried out by an eNB of the communication system. In particular, the method 800 is carried out by an eNB of a cellular network. The method 800 may be regarded as a specific implementation of the method 500 described above.

In a step 802, the eNB prepares a DL TI of a length L with R DMRS symbols. In other words, the eNB prepares the DL transmission of B PRBs. In a step 804, the eNB calculates a number of Cell-specific Reference Signal (CRS) symbols C from TTI OFDM symbol indices. More precisely, the eNB calculates the number C of OFDM symbols in the sTTI that have CRS, from the start index of the sTTI and the TTI length.

In a step 806, the eNB calculates the number of REs N based on the following equation:

$$N = B*(L*12 - C*N_{CRS} - R*N_{DMRS}) \qquad [\text{Eq. 2}]$$

Here, N is the number of data REs in the TTI, B is the allocation bandwidth represented by a number of PRBs, and L is the sTTI length represented by the number of OFDM symbols to be transmitted in one TTI. C is the number of OFDM symbols in the sTTI that have CRS, $N_{CRS}$ is the number of CRS REs per PRB in symbols with CRS in DL, and R Is the number of OFDM symbols in the sTTI with DMRS. $N_{DMRS}$ is the number of DMRS REs per PRB used in DL in symbols with DMRS. All of these parameters are known by the eNB (i.e., present in a memory or derivable from information stored in a memory of the eNB).

In the above Eq. 2, the number 12 represents the number of subcarriers in one PRB. In case a different number S of subcarriers in one PRB is used, the value 12 In Eq. 2 is replaced by the number S.

With the calculated value for N from Eq. 2 above, the eNB accesses, in a step 808, a TBS table where the rows (in this example) are for a certain number of REs and the columns are for a certain TBS index, see the exemplary TBS table 900 shown in FIG. 9. Thus, based on the calculated number N of data REs in the TTI and based on a TBS Index, a TBS is selected from the TBS table. Of course, alternatively, a TBS table may be provided, in which the columns indicate a certain number of REs and the rows indicate a certain TBS Index.

The eNB may derive the TBS Index from a first Index based on a lookup table, in which a first row Indicates a particular first index and a second row indicates a particular TBS Index. The first index may be a Modulation and Coding Scheme (MCS) index.

In particular, the TBS table accessed by the eNB may be the same TBS table accessed by the UE. In other words, the TBS table accessed by the eNB may have the same TBS values for the same combinations of TBS index—number of REs as the TBS table accessed by the UE. The TBS table accessed by the UE may be stored in a memory of the UE. The TBS table accessed by the eNB may be stored in a memory of the eNB. The TBS table accessed by the UE may have been previously transmitted from the eNB to the UE.

FIG. 9 shows an example of a TBS table 900 that may be accessed by the UE and/or by the eNB of the mobile communication network. More precisely, FIG. 9 only shows part of an sTTI TBS table 900, wherein dots (" . . . ") indicate that the table 900 extends further in both dimensions.

For example, in case the lowest allocation is 10 PRBs (allocation bandwidth B=10) and the minimum TTI length is 1 symbol (L=1), the above equations Eq. 1 and Eq. 2 result in a lowest number of REs N=120 for symbols without DMRS and without CRS. In this case, depending on the assigned TBS Index and using the exemplary TBS table 900, the TBS is selected to be 8 (TBS Index 0), 16 (TBS Index 1), 24 (TBS Index 2), and so on.

In an embodiment, the TBS table (e.g. TBS table 900) is instead exchanged with a set of tables {T_i} where the index i corresponds to a number of data OFDM symbols in the TTI. The rows (or columns) of these tables correspond to a certain number of PRBs, just as in current LTE. In this case, the UE and/or the eNB calculate the number of data symbols and access the associated TBS table i with the allocated number of PRBs. This embodiment may be carried out, e.g., by using the apparatus 300 and/or the method 600 described above.

Figure 10:
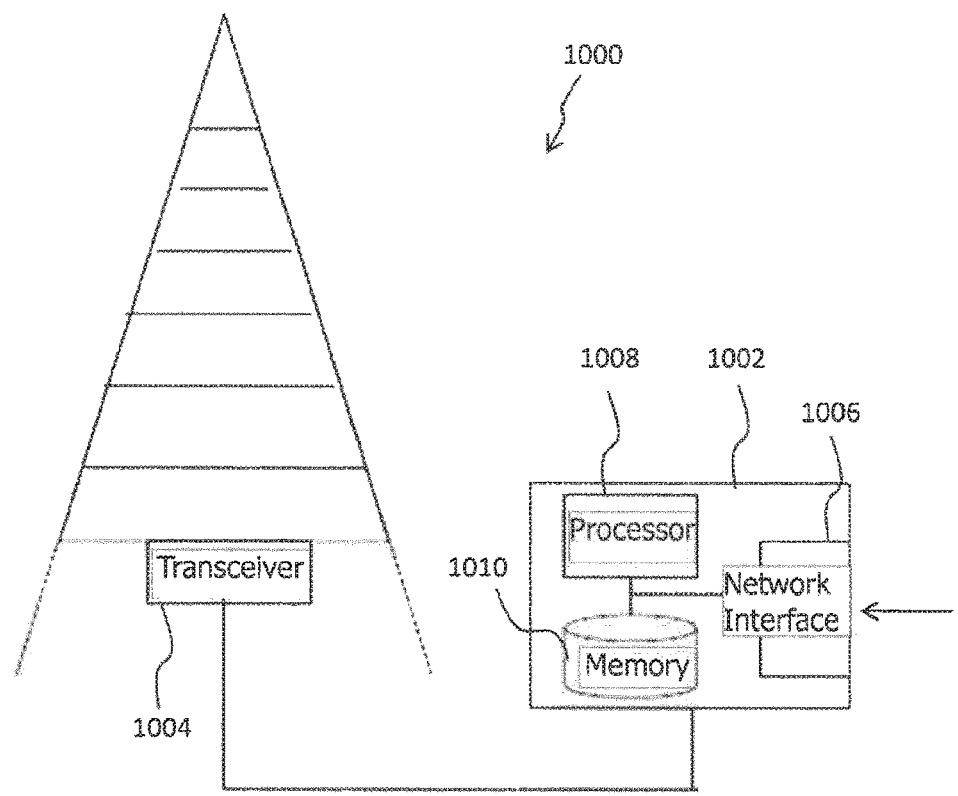
FIG. 10 schematically Illustrates an embodiment of a base station that may comprise the apparatus of FIG. 2 or FIG. 3.

FIG. 10 shows a schematic block diagram for an example base station 1000. The base station 1000 may correspond to or may comprise the apparatus 200 and/or the apparatus 300 described above. The base station 1000 may be an eNB. The base station 1000 may be configured to carry out the method 500 and/or the method 600. In particular, the base station 1000 may be configured to carry out the method 800 described above. The base station 1000 shown in FIG. 10 may correspond to any of the base stations 1000 shown in FIG. 11.

Figure 11:
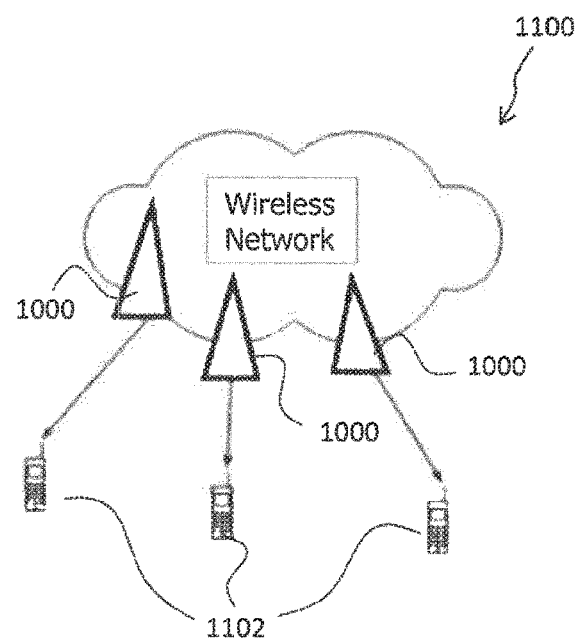
FIG. 11 schematically Illustrates a mobile communication network for wireless communications and a communication system.

Although the Illustrated base station 1000 of FIG. 11 may represent network nodes that include any suitable combination of hardware and/or software, the base station 1000 may, in particular embodiments, represent a device such as the example base station illustrated in FIG. 10.

The base station 1000 may include a node 1002 and a transceiver 1004 coupled to the node 1002. The node 1002 may comprise a network interface 1006 for receiving various data, e.g., via a backhaul network of the cellular network. For example, the steps 202 to 210 of the method 200 may be carried out by a processor 1008 of the base station 1000. A TBS table and other information may be stored in a memory 1010 of the base station 1000.

Alternatively or in addition, as shown in FIG. 10, the example base station 1000 includes a processor 1008, a memory 1010, a transceiver 1004, and an antenna. In particular embodiments, some or all of the functionality described above as being provided by a mobile base station, a base station controller, a node B, an enhanced node B, an EnodeB (eNB) and/or any other type of mobile communications node, may be provided by the base station processor 1008 executing Instructions stored on a computer-readable medium, such as the memory 1010 shown in FIG. 10.

Alternative embodiments of the base station 1000 may Include additional components responsible for providing additional functionality, including any of the functionality identified above and/or any functionality necessary to support the solution described above.

Although the described technique may be implemented in any appropriate type of telecommunication system, e.g., supporting any suitable communication standards and using any suitable components, particular embodiments of the described technique may be implemented in a network, e.g., the network 1100 illustrated in FIG. 11.

As shown in FIG. 11, the example network 1100 (mobile communication network or cellular network) may Include one or more instances of user equipment (UEs) 1102 and one or more base stations 1000 capable of communicating with these UEs 1102, along with any additional elements suitable to support communication between UEs 1102 or between a UE 1102 and another communication device (such as a landline telephone). A communication system according to the present disclosure may comprise, e.g., at least one of the base stations 1000 and at least one of the UEs 1102 indicated in FIG. 11.

Figure 12:
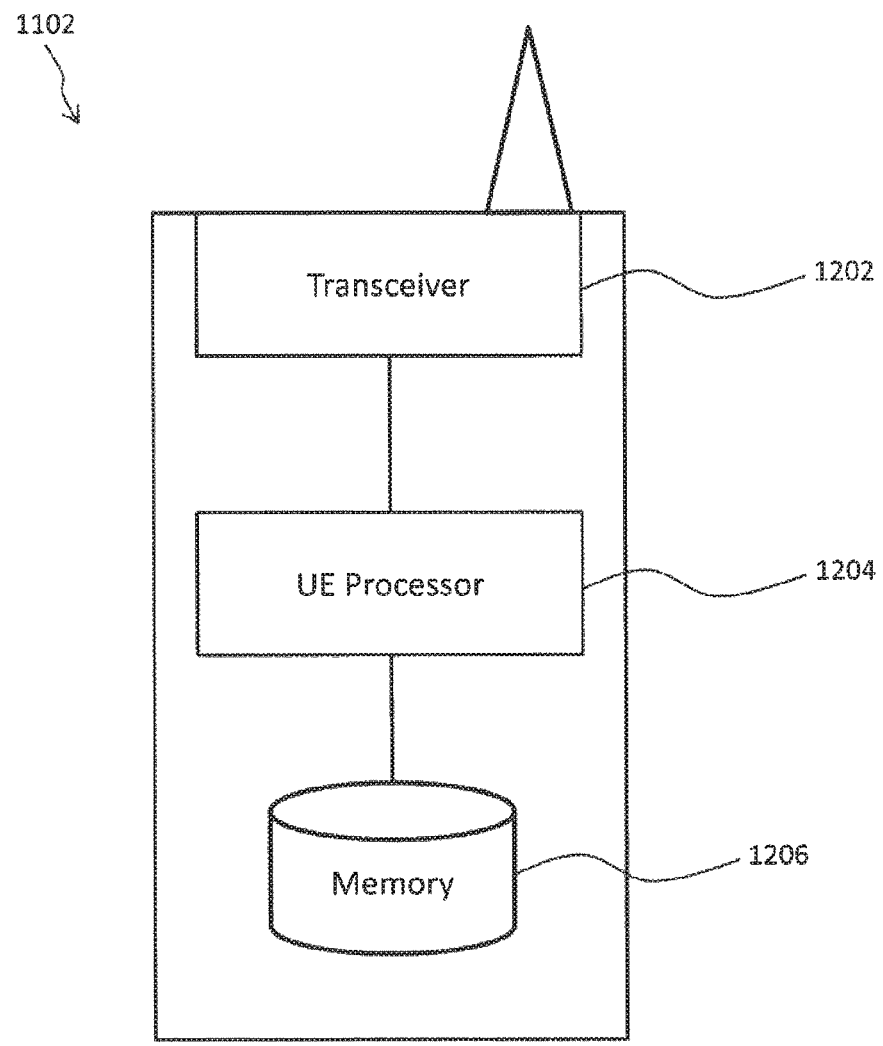
FIG. 12 schematically illustrates an embodiment of a User Equipment (UE) In wireless communication with the base station of FIG. 10, wherein the UE of FIG. 12 may comprise the apparatus of FIG. 1 or FIG. 3.

Although the illustrated UEs 1102 may represent communication devices that include any suitable combination of hardware and/or software, these UEs 1102 may, in particular embodiments, represent devices such as the example UE 1102 illustrated in greater detail by FIG. 12.

As shown in FIG. 12, the example UE 1102 includes a processor 1204, a memory 1206, a transceiver 1202, and an antenna. In particular embodiments, any functionality necessary to support the technique described above may be provided by the UE processor 1204 executing Instructions stored on a computer-readable medium, such as the memory 1206 shown in FIG. 12. Alternative embodiments of the UE 1102 may include additional components beyond those shown in FIG. 12 that may be responsible for providing certain aspects of the functionality of the UE 1102, including any of the functionality necessary to support the technique described above.

The example UE 1102 shown in FIG. 12 may correspond to or may comprise the apparatus 100 and/or the apparatus 300 described above. The UE 1102 may be configured to carry out the method 400 and/or the method 600. In particular, the UE 1102 may be configured to carry out the method 700 described above.

The present disclosure enables TBS selection for short TTIs in UE and eNB in a flexible way allowing for different TTI lengths and varying number of reference symbols. According to the present disclosure, the UE and/or eNB use information about sTTI length, allocation bandwidth, and number of CRS and DMRS In sTTI to compute the number of data REs. This value is then used to access a sTTI TBS table.

As has become apparent from above description of example embodiments, embodiments provide an advantageous technique for selecting a TBS, in particular in the case of sTTI.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A user equipment (UE) in a communication system configured to select a Transport Block Size (TBS) for a data transmission, wherein the communication system supports variable Transmission Time Interval (TTI) lengths regarding the number of Orthogonal Frequency-Division Multiplexing (OFDM) symbols to be transmitted in one TTI, the apparatus comprising:
processing circuitry;
memory containing instructions executable by the processing circuitry whereby the apparatus is operative to:
receive, from a network node, first information indicative of a TTI length of the TTI for the data transmission;
receive, from the network node, second information indicative of a number of reference symbols included in the TTI, wherein the reference symbols are OFDM Demodulation Reference Symbols (DMRS);
decode, from the first information, the TTI length;
decode, from the second information, the number of reference symbols included in the TTI;
calculate, based on the TTI length and based on the number of reference symbols included in the TTI, a number of data symbols included in the TTI by using the equation D=L−R, wherein D is the number of data symbols included in the TTI, L is the TTI length represented by the number of symbols to be transmitted in one TTI, and R is the number of reference symbols included in the TTI;
calculate, based on an allocation bandwidth for the data transmission and based on the number of data symbols included in the TTI, a number of data Resource Elements (REs) in the TTI;
select the TBS, from a data structure, based on the calculated number of data REs.

2. The apparatus of claim 1, wherein the instructions are such that the apparatus is operative to calculate the number of data REs in the TTI by using the equation N=B*D*S, wherein N is the number of data REs in the TTI, B is the allocation bandwidth represented by a number of Physical Resource Blocks (PRBs), and S is the number of subcarriers in one PRB.

3. The apparatus of claim 1, wherein the first information and the second information are included in a Downlink Control Information (DCI) received by the apparatus.

4. The apparatus of claim 1, wherein the instructions are such that the apparatus is operative to select the TBS, from the data structure, based on the calculated number of data REs and based on a TBS index.

5. The apparatus of claim 4, wherein the instructions are such that the apparatus is operative to receive information indicative of the TBS index.

6. A method implemented by a user equipment (UE) in a wireless communication system for selecting a Transport Block Size (TBS) for a data transmission, wherein the communication system supports variable Transmission Time Interval (TTI) lengths regarding the number of Orthogonal Frequency-Division Multiplexing (OFDM) symbols to be transmitted in one TTI, the method comprising:
receiving, from a network node, first information indicative of a TTI length of the TTI for the data transmission;
receiving, from the network node, second information indicative of a number of reference symbols included in the TTI, wherein the reference symbols are OFDM Demodulation Reference Symbols (DMRS);
decoding, from the first information, the TTI length;
decoding, from the second information, the number of reference symbols included in the TTI;
calculating a number of data symbols included in the TTI based on the TTI length and based on the number of reference symbols included in the TTI;
calculating a number of data Resource Elements (REs) in the TTI based on an allocation bandwidth for the data transmission and based on the number of data symbols included in the TTI;
selecting the TBS, from a data structure, based on the calculated number of data REs,
wherein calculating the number of data symbols included in the TTI comprises calculating the number of data symbols included in the TTI by using the equation D=L−R, wherein D is the number of data symbols included in the TTI, L is the TTI length represented by the number of symbols to be transmitted in one TTI, and R is the number of reference symbols included in the TTI.

7. The method of claim 6, wherein the calculating the number of data REs in the TTI comprises calculating the number of data REs in the TTI by using the equation N=B*D*S, wherein N is the number of data REs in the TTI, B is the allocation bandwidth represented by a number of Physical Resource Blocks (PRBs), and S is the number of subcarriers in one PRB.

8. The method of claim 6, wherein the first information and the second information are included in a Downlink Control Information (DCI).

9. The method of claim 6, wherein the selecting the TBS is based on the calculated number of data REs and based on a TBS index.

10. The method of claim 9, further comprising receiving information indicative of the TBS index.

* * * * *